(12) United States Patent
Dalen

(10) Patent No.: US 8,826,624 B2
(45) Date of Patent: Sep. 9, 2014

(54) MULTI-PIECE ANCHOR SYSTEM FOR USE WITH STUD BACK-UP WALLS

(75) Inventor: Mark Van Dalen, Ottawa (CA)

(73) Assignee: Plexus Innovations Inc., Ottawa (CA)

( * ) Notice: Subject to any disclaimer, the term of this patent is extended or adjusted under 35 U.S.C. 154(b) by 0 days.

(21) Appl. No.: 13/539,763

(22) Filed: Jul. 2, 2012

(65) Prior Publication Data

US 2013/0008121 A1    Jan. 10, 2013

(30) Foreign Application Priority Data

Jul. 8, 2011   (CA) ..................................... 2745797

(51) Int. Cl.
*E04B 1/38* (2006.01)
*E04C 5/00* (2006.01)
*E04F 13/24* (2006.01)
*E04F 13/22* (2006.01)
*E04G 21/00* (2006.01)

(52) U.S. Cl.
CPC . *E04B 1/38* (2013.01); *E04F 13/24* (2013.01); *E04F 13/22* (2013.01); *E04G 21/00* (2013.01)
USPC ........................................... 52/704; 411/389

(58) Field of Classification Search
USPC ................... 52/704, 713, 714, 379, 378, 513; 411/389, 178
See application file for complete search history.

(56) References Cited

U.S. PATENT DOCUMENTS

| | | |
|---|---|---|
| 1,052,246 A | 2/1913 | Hammons |
| 1,069,821 A | 8/1913 | Sherwood |
| 2,256,961 A | 9/1941 | Pearson et al. |
| 2,293,743 A | 8/1942 | Miles et al. |
| 2,853,870 A | 9/1958 | Sinner et al. |
| 3,217,457 A | 11/1965 | Naar |
| 3,786,605 A | 1/1974 | Winfrey |
| 4,047,353 A | 9/1977 | Aarons |
| 4,056,904 A | 11/1977 | Dawdy |
| 4,226,061 A | 10/1980 | Day, Jr. |
| 4,473,984 A | 10/1984 | Lopez |
| 4,835,928 A | 6/1989 | Scott |
| 4,869,043 A | 9/1989 | Hatzinikolas et al. |
| 4,998,397 A | 3/1991 | Orton |
| 5,035,099 A | 7/1991 | Lapish |
| 5,207,043 A | 5/1993 | McGee et al. |

(Continued)

FOREIGN PATENT DOCUMENTS

| | | |
|---|---|---|
| CA | 2292177 | 12/1998 |
| GB | 1486170 | 9/1977 |
| GB | 2069564 | 8/1981 |

OTHER PUBLICATIONS

BaileyBrick Connector (two pages)—indated.

(Continued)

*Primary Examiner* — Brian Glessner
*Assistant Examiner* — Paola Agudelo
(74) *Attorney, Agent, or Firm* — Adam K. Sacharoff; Much Shelist

(57) ABSTRACT

There is described an improved multi-piece anchor body for use with masonry over stud back-up walls, the anchor body made up of an inner anchor body for connection to a back-up wall, a separate outer anchor body for connection to a masonry wall, and a separate intermediate membrane flange attachable to and between the outer anchor body and the inner anchor body.

11 Claims, 11 Drawing Sheets

(56) References Cited

U.S. PATENT DOCUMENTS

| | | | |
|---|---|---|---|
| 5,347,781 | A | 9/1994 | Hanton |
| 5,392,581 | A | 2/1995 | Hatzinikolas et al. |
| 5,415,510 | A * | 5/1995 | Funaki et al. ............... 411/384 |
| 5,611,183 | A | 3/1997 | Kim |
| 5,816,008 | A * | 10/1998 | Hohmann ...................... 52/565 |
| 5,857,817 | A * | 1/1999 | Giannuzzi et al. ........... 411/82.3 |
| 5,987,830 | A | 11/1999 | Worley |
| 6,131,360 | A | 10/2000 | Dalen |
| 7,415,803 | B2 * | 8/2008 | Bronner ........................ 52/378 |
| 7,818,940 | B2 * | 10/2010 | Herb ............................. 52/704 |
| 8,037,653 | B2 * | 10/2011 | Hohmann, Jr. ................ 52/379 |
| 2002/0100239 | A1 * | 8/2002 | Lopez ............................. 52/379 |
| 2008/0310933 | A1 * | 12/2008 | Ricciardo .................... 411/161 |
| 2010/0037552 | A1 * | 2/2010 | Bronner ........................ 52/713 |
| 2012/0272609 | A1 * | 11/2012 | Kim ............................... 52/702 |
| 2012/0304576 | A1 * | 12/2012 | Hohmann, Jr. ................ 52/513 |

OTHER PUBLICATIONS

Bailey Lightweight Steel Framing Systems (four pages)—printed by Bailey Co., Concord, Ontario.

Blok-Lok Limited (three pages)—printed by Bailey Co. of Canada (address unknown).

Masonry Anchor to Steel Stud Product Information Sheet (one pages)—undated.

Canadian Standards Association building code chapter on connectors for masonry; p. 39 & p. 46—Feb. 1994.

Canada Mortgage & Housing Corp. (CMHC) reference publication, entitled "Brick Veneer on Concrete Masonry or Steel Stud Wall Systems", p. 56, 59, 104, 105, 124, 142, 160, 164, & 166; published 1991 by Canada Mortgage & Housing Corporation.

Seminar on Brick Veneer Wall Systems, Chapter 21, p. 21-1through 21-27, entitled "A Summary Behavior of Brick Veneer/Steel Stud Tie Systems" seminar presented in Canada in 1989.

Brick Veneer/Steel Stud Wall Design and Construction Practices in Canada—Results of a 1986 Survey; prepared by Suter Keller Inc., Ottawa, Canada in Mar. 1986; p. 13, 14, 22, 33, 67, 80-81.

"Field Investigation of Brick Veneer / Steel Stud Wall Systems"; report prepared by Suter Keller, Inc., of Ottawa, Ontario, p. 9, 10, 18, & 19.

Part 3 of the McMaster University Laboratory Test Program on Brick Veneer/Steel Stud Wall Systems; prepared by R. G. Drysdale, et al, Dept. of Civil Engineering, McMaster University, Hamilton, Ontario, Canada; May 1990; p. 69,71,75,75,76,78 & 79.

Dur-O-Wal "Technical Documentation for Adjustable Veneer Anchor System" Author—Dur-O-Wal, Inc. (pp. 1- 6); date unknown.

Dur-O-Wal "New Product Information : D/A 213 Veneer Anchor Assemblies" Author—Dur-O-Wal, Inc., (two pages); 1986.

Dur-O-Wal "Code Approved Masonry COnnections for Seismic Conditions and High Wind Loads" Author—Dur-O-Wal Seismic Products (three pages), 1992.

Dur-O-Wal "Your Source Book for Masonry Joint Reinforcement" Author—Dur-O-Wal, Inc. (four pages), date unknown).

Dur-O_Wal—Joint Reinforcement—Connector Detailing and Selection Guide—Author—Dur-O-Wal, Inc.(pp. 1, 2, 5, 6); 1993. pdf.

* cited by examiner

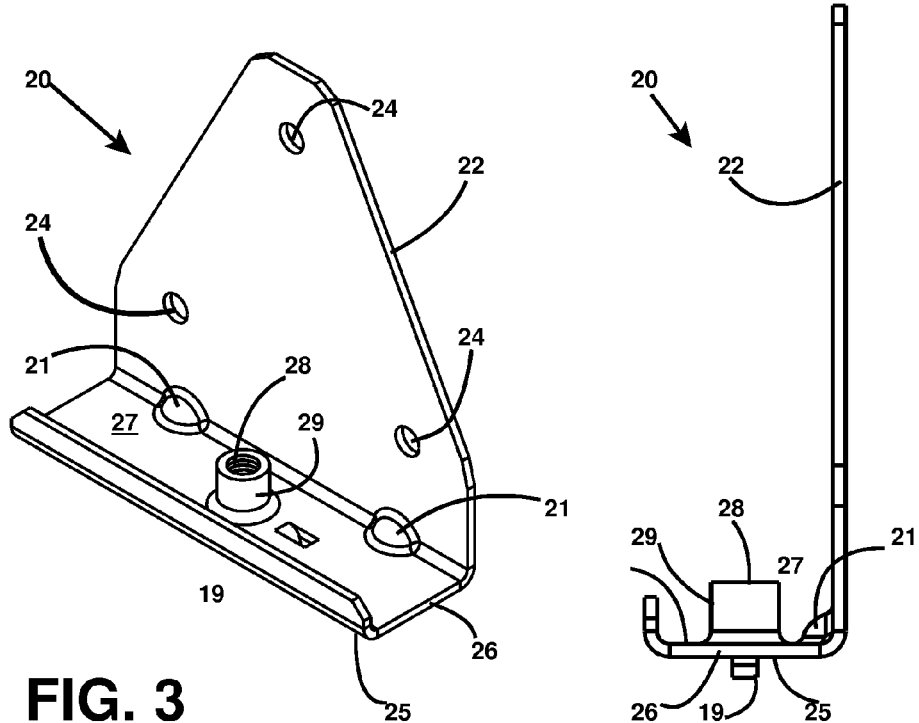
FIG. 3
FIG. 4
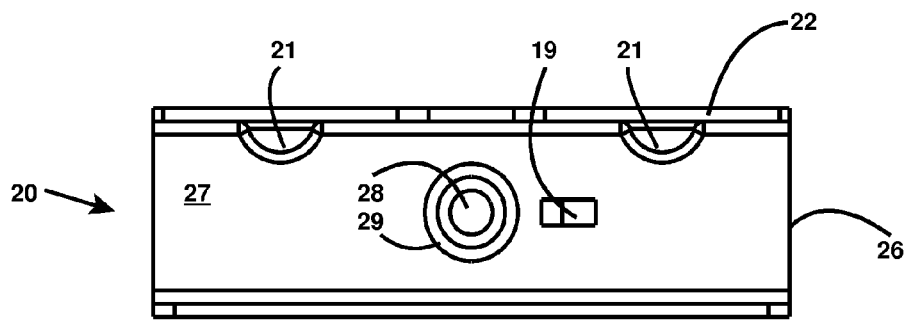
FIG. 5

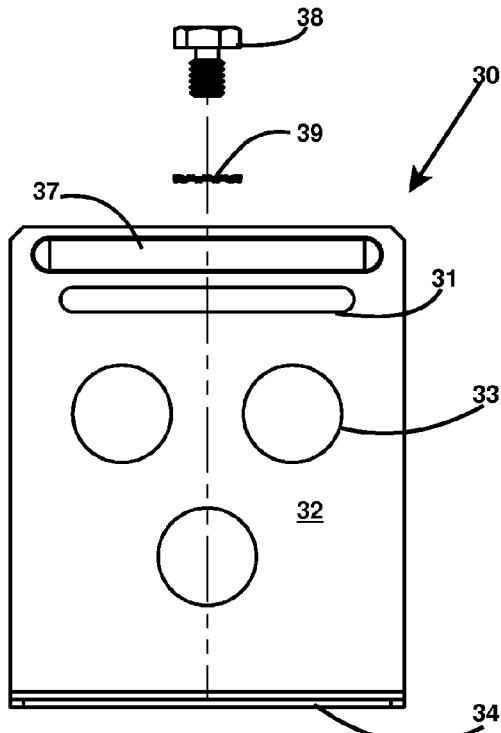
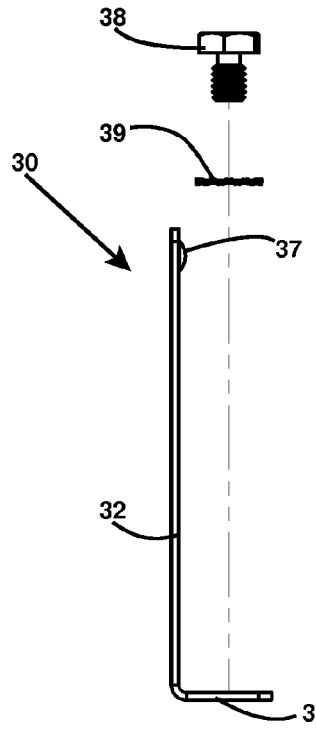
FIG. 21  FIG. 21a
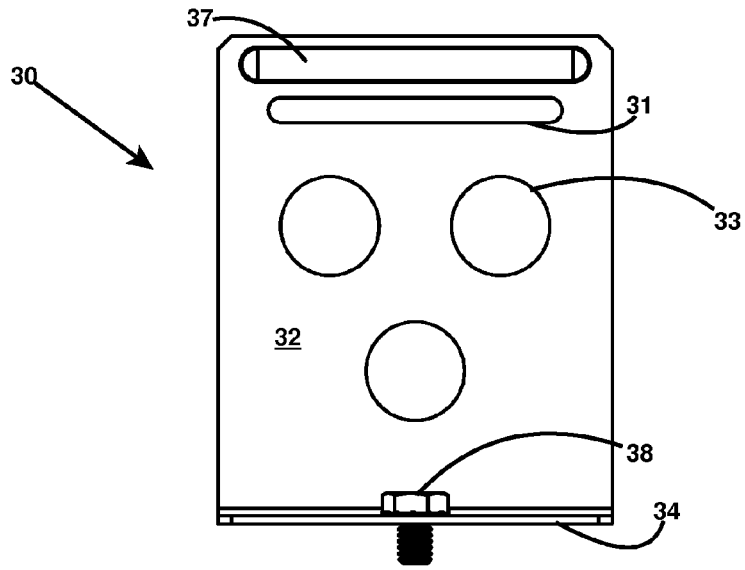
FIG. 22

MULTI-PIECE ANCHOR SYSTEM FOR USE WITH STUD BACK-UP WALLS

FIELD OF THE INVENTION

This invention relates to construction materials and to an anchor for use with masonry over stud back-up walls in particular.

BACKGROUND OF THE INVENTION

In the past, exterior walls of buildings were commonly constructed of solid masonry, involving multiple wythes (or thicknesses) of masonry laid up together. Floor joists were supported in recesses in the inner masonry wythe and floors, room partition walls, and the rest of the inside of the building were supported on these joists. In some cases, insulation was installed between wythes.

In the past few decades, solid masonry wall construction has been replaced by masonry veneer wall construction. For example, in single family residential construction, a frame of a house is constructed, usually of wooden studs, sheathing material is affixed to the outer surface of the studs and a single masonry wythe (often brick) is erected as a veneer outside of the sheathing material. In residential construction, insulating material is most often installed in the space between adjacent wooden studs. The masonry veneer wall is attached to the back-up wall of wooden studs using an array of anchors. The outer end of each anchor terminates as an embedment within the mortar bed between the courses of masonry, placed as the wall is erected. The inner end of each anchor is usually fastened to a wooden stud in the wooden back-up wall framing.

More recently, especially in commercial buildings, the back-up wall to which the masonry veneer is attached has been made of steel studs and some, or all, of the insulating material is installed outboard of the steel stud framing. In this form of masonry veneer construction, the attachment between the metal studs and the masonry also involves an array of anchors. These anchors are commonly one-piece formed metal, with a slot or set of holes near the outer end of the anchor. In one common form of attachment, the anchor resembles a bayonet that is fastened to the side of the steel stud and pierces the exterior sheathing (and any other materials outboard of the sheathing). In such a case, the inner portion of each anchor can be screwed or bolted to a steel stud. A bent tie wire is inserted through slots or holes in the outer end of the anchor and then embedded in the mortar bed between courses of masonry.

Current building codes require an air, moisture and vapor barrier membrane to be installed within most exterior wall assemblies. In commercial and some residential construction, designers often use a single membrane applied over the exterior surface of sheathing to meet this requirement in veneer wall construction with steel stud back-up walls. However, for walls using bayonet style masonry anchors, common in the industry today, the membrane must be interrupted by the bayonets that protrude from the sheathing, thereby piercing the membrane. For the membrane to remain as a functional air, moisture and vapor barrier, mastic/caulking must be applied around each spot where a bayonet pierces the membrane. The mastic/caulking is applied manually and its application is a time consuming process if a proper seal around each bayonet is to be achieved. In reality, it is unlikely that the membrane will be completely sealed once all the caulking is completed. There are many potential spots along a wall where the caulking may not be properly applied, resulting in openings in the air, moisture and vapor barrier membrane. Furthermore, the durability of the seal relies on the durability of the caulking around each anchor.

One recent attempt to solve this problem is described in U.S. Pat. No. 6,131,360 to Van Dalen. Van Dalen describes a one-piece anchor body having an inner portion for connecting to the steel back-up wall, an outer portion for connecting to the masonry and an intermediate flange between and integral with the inner and outer portions. The membrane flange extends outwardly in all directions and sits flush against the exterior sheathing of the back-up wall so that a membrane applied to the exterior sheathing may be lapped and sealed all around the outer portion of the anchor body without the need for any additional caulking or other applications. One of the problems with the one-piece anchor described by Van Dalen, however, is that it must be inserted through the exterior sheathing from the outside, and requires coordinated and simultaneous labour on the inside of the wall to attach the anchor to the stud. One other problem with the one-piece anchor is that, while it improves the quality and durability of the seal around each anchor, it does not provide for efficient and simple installation of membrane over a smooth uninterrupted surface. While this may not create a significant air leakage problem due to the presence of the membrane flange, it still creates an extra step during installation as care must be taken to properly position the membrane prior to piercing by the anchor body. Yet another problem with all current, one-piece anchors is that the conductive anchors act as thermal bridges through the insulation layer, whereby heat flow through the anchors reduces the effectiveness of the thermal protection provided by the wall assembly.

SUMMARY OF THE INVENTION

The present multi-piece anchor system addresses the major shortcomings of the prior art.

The one-piece bayonet design of current anchors is replaced by a multi-piece anchor body, having an inner bracket or anchor body portion, a separate outer bracket or anchor body portion and a separate intermediate disk or flange portion. After exterior sheathing is attached to the studs, the location of the inner anchor body is established on the interior of the sheathing. A hole is drilled through the sheathing from the inside to mark the exact point of connection for the intermediate flange portion to be installed from the exterior in later steps. The inner anchor body is fastened to a stud within the back-up wall in the usual fashion, with the inner anchor body aligned to the hole previously drilled through the sheathing. From the exterior, the intermediate flange portion is threadably attached, through the hole in the exterior sheathing, to each inner anchor body and the bottom surface of the intermediate flange rests flush against the outer surface of the exterior sheathing. When a barrier membrane (which typically has an adhesive applied to the inner surface that contacts the sheathing) is placed over the exterior sheathing, the inner surface of the barrier membrane is laid overtop of the top or outer surface of the intermediate flange and is therefore not pierced by the anchor body. That is, the membrane can be unrolled in full-width sheets and applied onto the exterior of the wall without any interference. The outer anchor body is then threadably attached through the barrier membrane to the intermediate flange. While the bolt used to attach the outer anchor body to the intermediate flange will pierce the barrier membrane, the threaded female receptor for the bolt is made to be integral and airtight with the intermediate flange. Thus even with a hole in the membrane at the outer anchor bolt, the contiguous membrane and intermediate flange portion remain a continuous, air tight assembly. One leg of the "L-shaped" outer anchor body bracket presses the adhesive-coated barrier membrane in contact with the top or outer surface of the intermediate membrane flange thereby ensuring the air seal continuity between membrane and intermediate flange at each point where the barrier membrane is pierced by an outer anchor body bolt. Thus, continuity of the barrier membrane is ensured without need for the application of any mastic/caulking. Finally, the multi-piece anchor body improves on the thermal bridging characteristics of the current art. The relatively low thermal conductivity of the barrier membrane applied over the outer surface of the intermediate flange creates a thermal break between the outer anchor and the intermediate flange, which thereby limits the amount of heat flow through the anchor assembly.

The present multi-piece anchor system is useful in that it performs the function of what is currently in use to anchor masonry veneer walls to a supporting back-up wall while greatly reducing air leakage through the anchors by improving the integrity and durability of the membrane barrier applied over the exterior sheathing, and saves labour costs associated with attempting to achieve membrane integrity with current practices. The present multi-piece anchor system also provides an efficient and flexible means of installation that can be adapted to many different construction strategies. Moreover, the present multi-piece anchor system also provides a more energy efficient means of anchoring masonry veneer walls because the assemblage of the system involves the installation of a barrier membrane that acts as a thermal break between the inner and outer bodies of the anchor.

One object is to provide a multi-piece anchor for use as a component of an anchor system, the anchor being an improvement on presently existing anchor systems. A further object is to provide a multi-piece anchor body whose components are economical to manufacture and that is simple to install. Another object is to provide a multi-piece anchor body, having an inner anchor body portion for connection to a back-up wall, a separate outer anchor body portion for connection to a masonry wall and a separate intermediate membrane receiving disk or flange portion that is located between and is attachable to the outer anchor body portion and the inner anchor body portion.

According to one aspect then, there is provided a multi-piece anchor body for connecting an inner back-up wall comprised of exterior sheathing affixed to a frame of studs and an outer masonry wall, the multi-piece anchor body comprising: an inner anchor body for connection to the back-up wall; a separate outer anchor body having a terminal end for connection to the masonry wall; and a separate intermediate flange for connection to and between the inner anchor body and the outer anchor body.

In other aspects of the multi-piece anchor body, the intermediate flange may be connected to the inner anchor body and the outer anchor body through a threaded connection, a press fit, or a twist fit. The inner anchor body, the outer anchor body and the intermediate flange may be made of metal, plastic or fibre reinforced plastic. The inner anchor body may be connected to a side face of the studs within the back-up wall. The intermediate flange connects to the inner anchor body through a sheathing hole or slot cut through the exterior sheathing. The inner anchor body includes an alignment tab for aligning the inner anchor body with the sheathing hole or slot to facilitate connection of the intermediate flange to the inner anchor body and to ensure that the intermediate flange may be positioned flush against an outer surface of the exterior sheathing. The intermediate flange comprises a main disk and a flange bolt connected thereto. The main disk and the flange bolt may be constructed as a single, unitary airtight element. Advantageously, the main disk should be at least 50 mm in diameter. The flange bolt is externally threaded on a first inner end for threaded connection to the inner anchor body and has an internally threaded cavity on a second opposite outer end for threaded connection to the outer anchor body. The first inner end of the flange bolt is solid to prevent air leakage through the intermediate flange. The terminal end of the outer anchor body accepts connection of a bent tie wire that may be embedded in the masonry wall and may be reinforced to limit deformation of the outer anchor body when a load is transferred to the bent tie wire.

In another aspect, there is provided a method of installing a multi-piece anchor body for connecting an inner back-up wall comprised of exterior sheathing affixed to a frame of studs and an outer masonry wall, the method comprising the steps of: cutting a hole in the exterior sheathing; aligning an inner anchor body with the sheathing hole; fastening the inner anchor body to one of the studs; connecting an intermediate flange to the inner anchor body through the hole in the exterior sheathing; applying a barrier membrane over top of the outer surface of the exterior sheathing and an outer surface of the intermediate flange; connecting an outer anchor body to the intermediate flange, the outer anchor body having a terminal end for connection to the masonry wall.

In other aspects of the method described above, the intermediate flange is connected to the inner anchor body and the outer anchor body by a threaded connection, a press fit, or a twist fit. The outer anchor body and the intermediate flange may be made of metal, plastic or fibre reinforced plastic. The inner anchor body is connected to a side face of one of the studs within the back-up wall. A bottom surface of the intermediate flange is positioned flush against an outer surface of the exterior sheathing. The inner anchor body includes an alignment tab, which is used to align the inner anchor body with the sheathing hole to facilitate connection of the intermediate flange to the inner anchor body and to ensure that the intermediate flange may be positioned flush against an outer surface of the exterior sheathing. The intermediate flange comprises a main disk and a flange bolt connected thereto. The main disk and the flange bolt may be constructed as a single, unitary airtight element. Advantageously, the main disk should be at least 50 mm in diameter. The flange bolt is externally threaded on a first inner end for threaded connection to the inner anchor body and has an internally threaded cavity on a second opposite outer end for threaded connection to the outer anchor body. The flange bolt is solid to thereby prevent air leakage through the intermediate flange. Further steps include connecting a bent tie wire to the terminal end of the outer anchor body and embedding the bent tie wire in the masonry wall. The terminal end of the outer anchor body may be reinforced to limit deformation of the outer anchor body when a load is transferred to the bent tie wire.

BRIEF DESCRIPTION OF THE DRAWINGS

Referring to the drawings wherein like reference numerals indicate similar parts throughout the several views, several aspects of the multi-piece anchor system are illustrated by way of example, and not by way of limitation, in detail in the figures, wherein:

FIG. 3 is a perspective view of the inner anchor body;

FIG. 4 is a top plan view of the inner anchor body;

FIG. 5 is a front view of the inner anchor body;

FIG. 21 is an exploded side view of the outer anchor body illustrating assembly of the captive outer anchor body screw;

FIG. 21a is an exploded top plan view of the outer anchor body illustrating assembly of the captive outer anchor body screw;

FIG. 22 is a side view of the outer anchor body with the captive outer anchor body screw fully inserted and ready for connection to the intermediate flange;

DETAILED DESCRIPTION OF THE INVENTION

Figure 1:
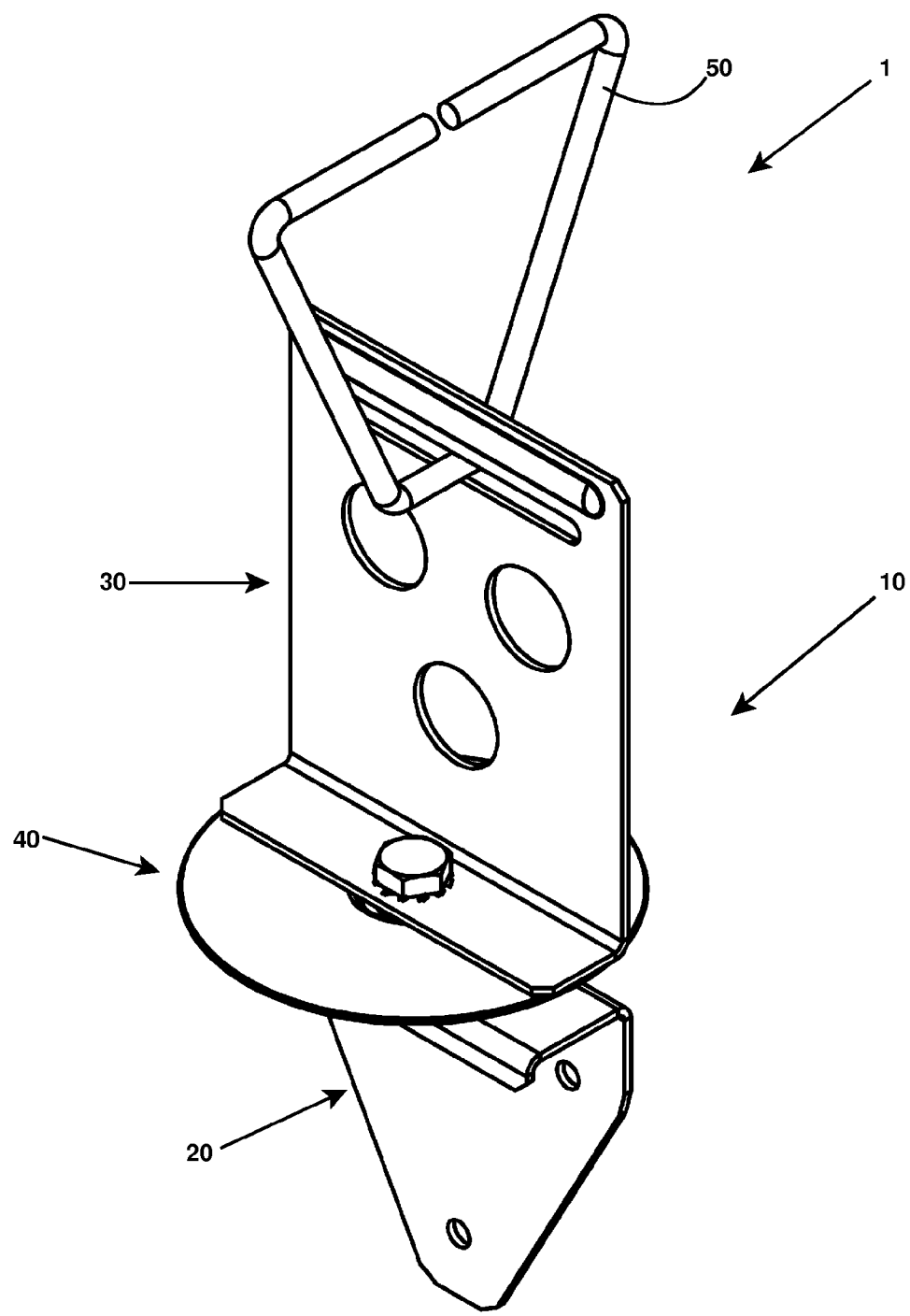
FIG. 1 is a perspective view of the multi-piece anchor in an assembled form.
Figures 2, 2A:
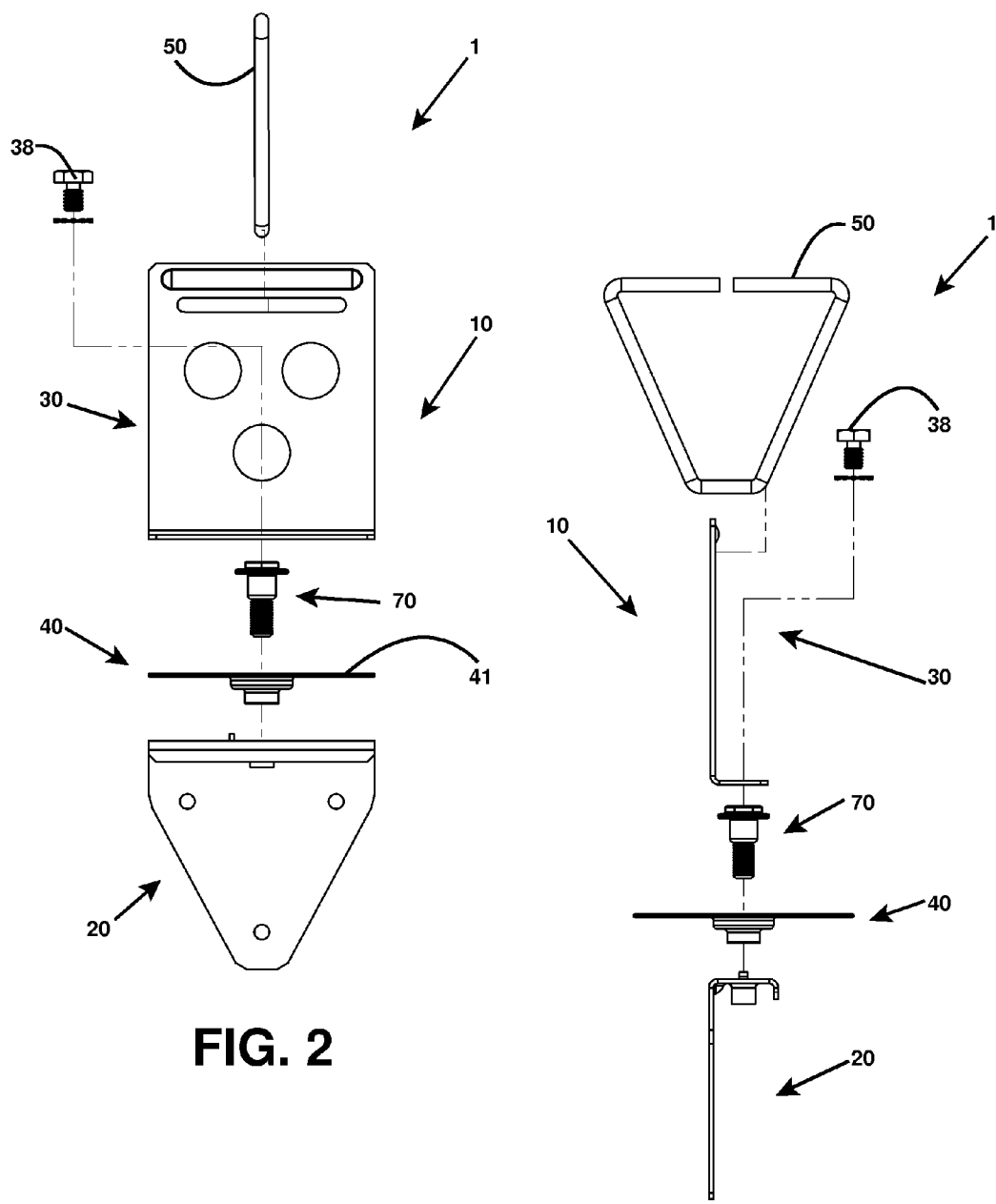
FIG. 2 is an exploded side view of the multi-piece anchor.
FIG. 2a is an exploded top plan view of the multi-piece anchor.

Referring to FIGS. 1, 2 and 2a, multi-piece anchor 1 consists of a bent tie wire 50, and an anchor body 10, the anchor body comprising an inner anchor body 20, a separate outer anchor body 30, and a separate intermediate flange 40.

Anchor body 10 may be constructed of metal or plastic or fibre reinforced plastic, or any other suitable material that is strong enough to support loading from an attached exterior masonry wall 100 (see FIG. 25) and transfer such loads to an interior back up wall or building frame 200 made up of studs 201, when anchors 1 are installed between the masonry wall and the building frame in a regular grid pattern. This grid pattern is usually set in accordance with applicable codes and standards and is quite often at a density of one anchor 1 every sixteen inches, centre to centre, along the length of wall 100 and one anchor 1 every sixteen inches, centre to centre, along the height of wall 100. The material from which the anchors are constructed must not only be strong, but also corrosion resistant and durable in potentially moist conditions.

Referring to FIGS. 3-5, in one embodiment, inner anchor body 20 is an "L-shaped" bracket. A long leg 22 of the inner anchor body 20 is used for fastening the inner anchor body to stud 201 after exterior sheathing 60 is installed on the outside of the frame 200 of studs 201 and sheathing holes 65 (see FIG. 25) are drilled. Any suitable fastening means will suffice such as screws, bolts, rivets, nails or the like. For simplicity, three screw holes 24 are illustrated here. A short leg 26 of the "L-shaped" inner anchor body 20 has a bottom surface 25 that abuts flush against an inside surface 61 of exterior sheathing 60, and a top surface 27 that faces toward the interior of the frame 200 when inner anchor body 20 is attached to stud 201. Short leg 26 of inner anchor body 20 includes an internally threaded inner anchor body hole 28, which may have an internally threaded inner anchor body collar 29 extending inward and parallel to long leg 22 to provide a suitable length of thread for connection of the intermediate flange 40 (as described below). Stiffening dimples 21 may also be included to increase strength.

Once the exterior sheathing 60 is installed, a sheathing hole 65 is drilled through the exterior sheathing 60 to align with the inner anchor body hole 28 in the inner anchor body 20 to be attached to stud 201. Advantageously, the sheathing hole 65 is drilled through the exterior sheathing from the inside, and an alignment tab 19 permits the installer to readily align the inner anchor body hole 28 with sheathing hole 65 by seating the tab against the edge of the hole. It is important that the inner anchor body hole 28 be properly centered within the sheathing hole 65 to ensure that the intermediate flange 40 may be positioned flush against an outer surface 63 of exterior sheathing 60.

Figure 12:
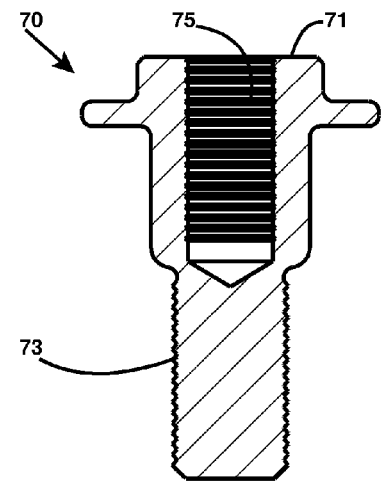
FIG. 12 is a cross-section through the center of the custom flange bolt of the intermediate flange.
Figure 13:
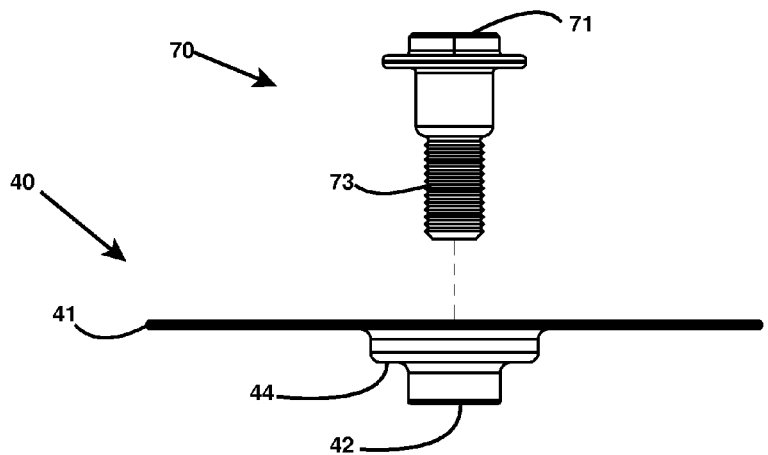
FIG. 13 shows the assembly of the custom flange bolt being inserted into the flange hole of the main disk of the intermediate flange.
Figure 14:
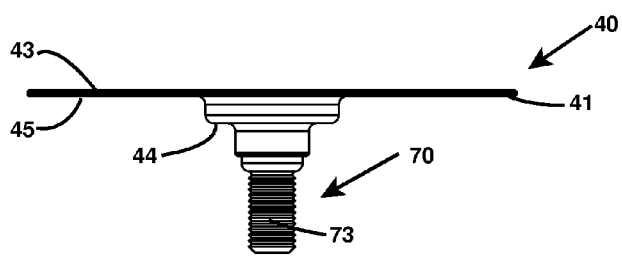
FIG. 14 shows a side view of the intermediate flange with the custom flange bolt welded in place.
Figure 15:
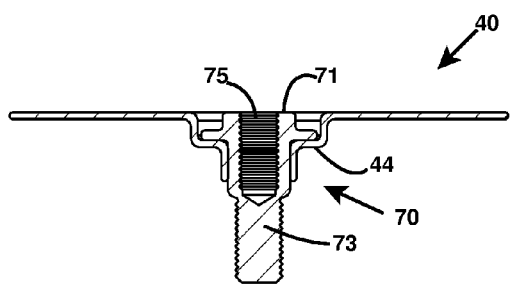
FIG. 15 is a cross-section through the center of the intermediate flange with the custom flange bolt welded in place.
Figure 17:
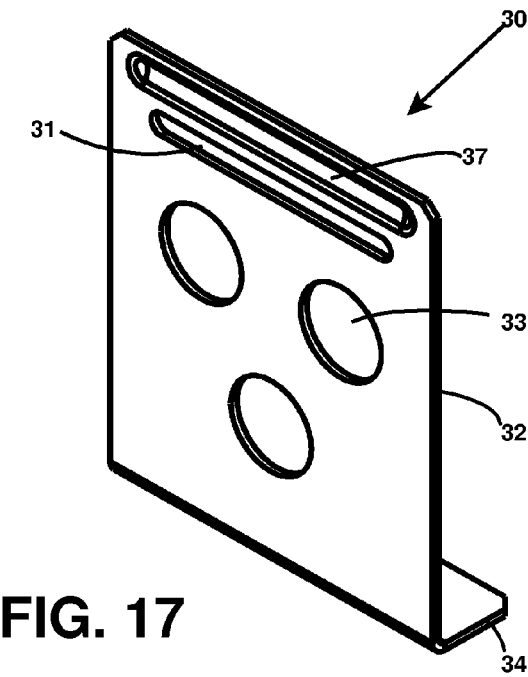
FIG. 17 is a perspective view of the outer anchor body.
Figure 18:
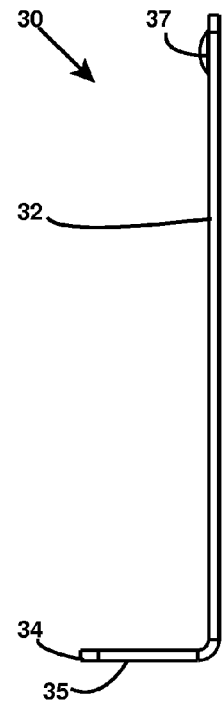
FIG. 18 is a top plan view of the outer anchor body.
Figure 19:
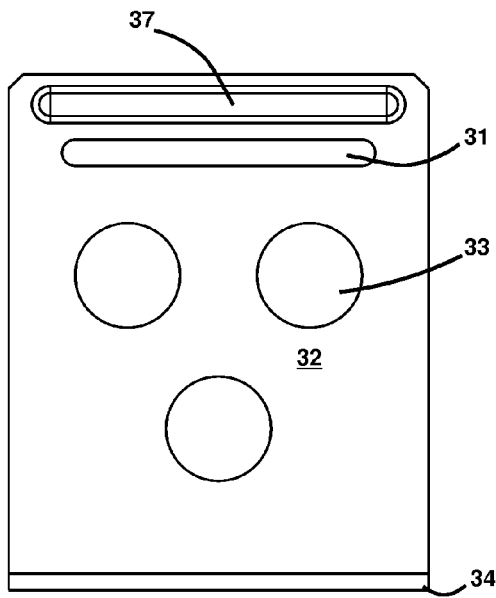
FIG. 19 is a side view of the outer anchor body.
Figure 20:
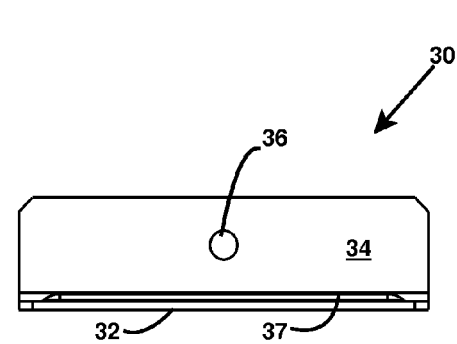
FIG. 20 is a front view of the outer anchor body.

Referring now to FIGS. 6-16, intermediate flange 40, includes a flat main disk or flange 41 (see FIGS. 6-8) and a custom flange bolt 70 (see FIGS. 9-12). Main disk 41 has a top or outer surface 43 and a bottom or inner surface 45. Main disk 41 includes a central flange hole 42 including a flange collar 44 which is indented on the top surface 43 and raised on the bottom surface 45. The flange hole and collar are sized and shaped to accept the custom flange bolt 70 such that when the flange bolt 70 is inserted into the flange hole 42 and seam welded to the flange collar 44, the top surface 71 of flange bolt 70 is flush with the top surface 43 of main disk 41, as shown in FIGS. 14 and 15.

The upper portion of custom flange bolt 70 includes a cavity 75, approximately one centimeter in depth. Cavity 75 is internally threaded to accept an outer anchor body connecting bolt 38 (see FIGS. 21, 21a and 22) for attachment of the outer anchor body 30 to the intermediate flange 40. The exterior perimeter of the upper portion of flange bolt 70 is shaped and sized to receive a standard socket driver for easy installation of the intermediate flange 40. The lower portion 73 of custom flange bolt 70 is solid and is externally threaded for connection to the inner anchor body 20 via internally threaded inner anchor body hole 28 and collar 29. The lower threaded portion 73 of flange bolt 70 protrudes through flange hole 42 and extends beyond flange collar 44 when flange bolt 70 is inserted into flange hole 42 and seam welded to the flange collar 44. The length of lower portion 73 of flange bolt 70 may vary depending on the thickness of the external sheathing 60 but is generally at least one centimeter in length.

Figure 6:
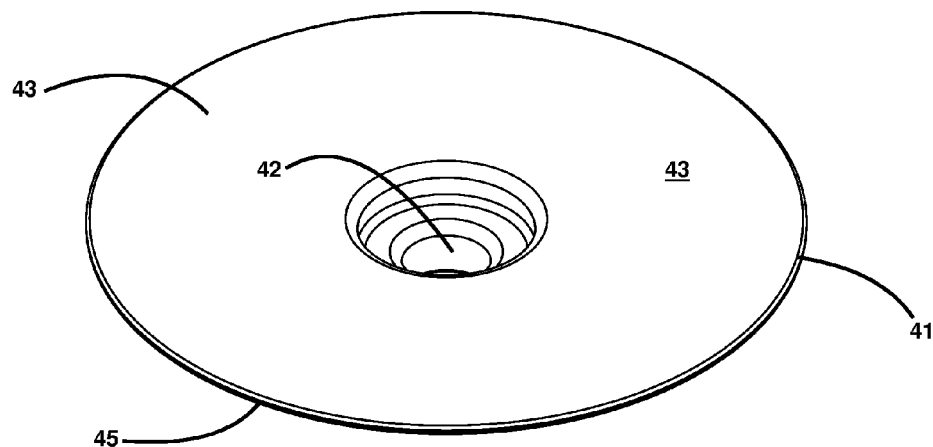
FIG. 6 is a perspective view of the main disk of the intermediate flange.
Figure 7:
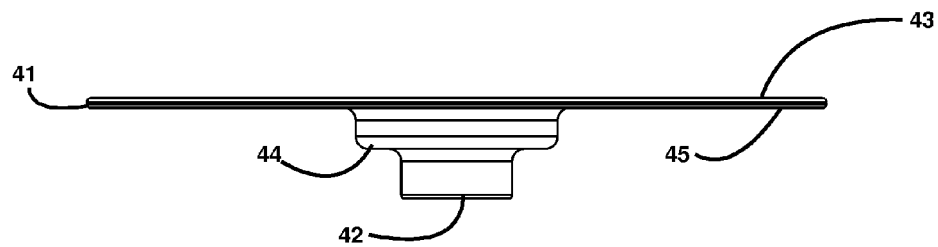
FIG. 7 is a side view of the main disk of the intermediate flange.
Figure 8:
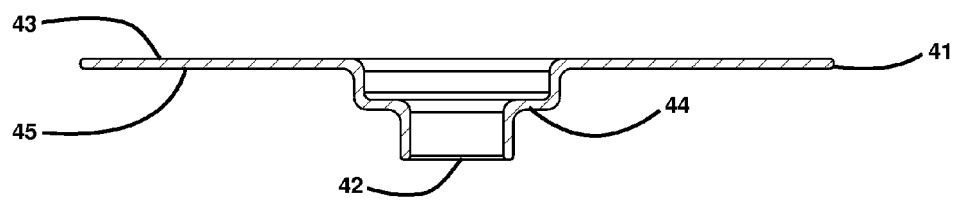
FIG. 8 is a cross-section through the center of the main disk of the intermediate flange.
Figure 9:
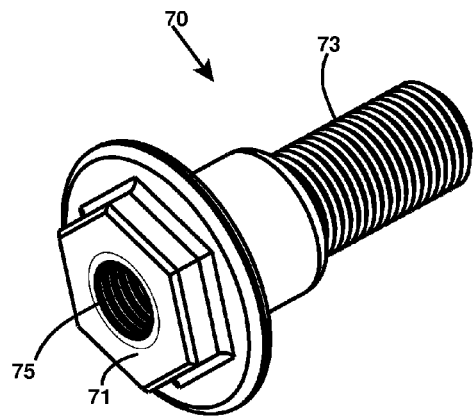
FIGS. 9 and 10 are perspective views of the custom flange bolt of the intermediate flange.
Figure 10:
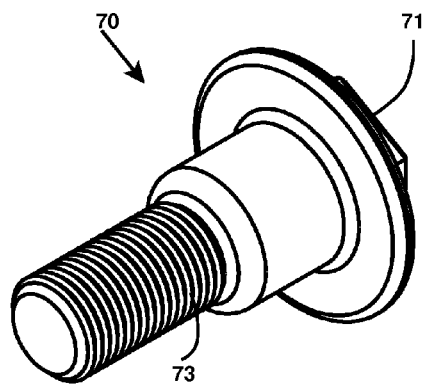
Figure 11:
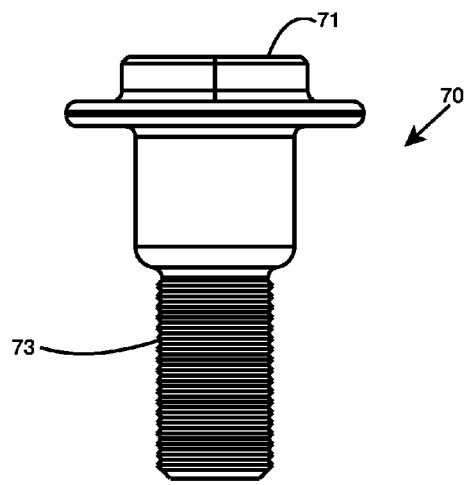
FIG. 11 is a side view of the custom flange bolt of the intermediate flange.
Figure 16:
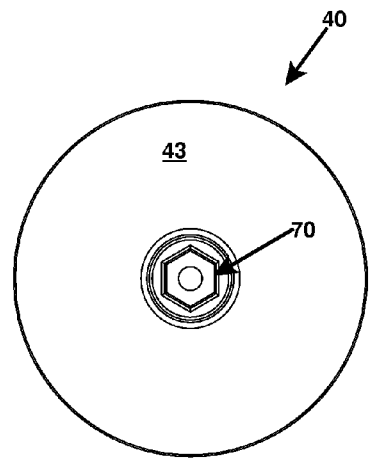
FIG. 16 is a front view of the intermediate flange.

To summarize, FIG. 6 is a perspective view of the main disk 41 of intermediate flange 40, showing the flange hole 42 and the indented flange collar 44. FIG. 7 is a side view of main disk 41 showing the flange collar 44 raised on the bottom surface 45 of main disk 41. FIG. 8 is a cross-section taken through the center of main disk 41. FIGS. 9 and 10 are perspective views of the flange bolt 70. FIG. 11 is a side view of flange bolt 70 and FIG. 12 is a cross-section taken through the center of flange bolt 70. FIG. 13 shows the assembly of flange bolt 70 being inserted into flange hole 42 of the main disk 41 and FIG. 14, shows a side view of the intermediate flange 40 following the welding of flange bolt 70 to flange collar 44. FIG. 15 is a cross-section of intermediate flange 40 taken through the center of custom flange bolt 70 and FIG. 16 is a front view of intermediate flange 40.

The lower portion 73 of flange bolt 70 of intermediate flange 40 is inserted through sheathing hole 65 in exterior sheathing 60 and connected to the inner anchor body 20 via internally threaded hole 28 and collar 29. Upon installation, the bottom surface 45 of intermediate flange 40 rests flush against the outer surface 63 of the exterior sheathing 60 once connection to the inner anchor body 20 is fully engaged. A barrier membrane 80, which typically includes a thin layer of adhesive on the inner surface, is then applied over the outer surface 63 of the exterior sheathing 60 and is simply lapped over the top surface 43 of main disk 41 of each intermediate flange 40. At this point, unlike the prior art anchors, the barrier membrane 80 is not pierced by the intermediate flange 40 or any other part of the multi-piece anchor 1. There is therefore no impediment to the installation of the barrier membrane 80. There is also no need to seal membrane 80 with mastic or caulking, thus saving time and money.

The diameter of the main disk 41 should be of sufficient size to receive the barrier membrane 80 and provide a satisfactory seal when the barrier membrane 80 is applied over the top surface 43 of intermediate flange 40. The applicant has found that a main disk diameter of at least 50 mm is sufficient for this purpose, while a greater diameter, and in particular a diameter of 75 mm or greater, provides a better seal.

Other options for connecting intermediate flange 40 to inner anchor body 20, rather than the threaded connections shown and described herein, may be possible. For example, in one option (not shown) a press fit may be used, whereby the lower portion 73 of flange bolt 70 is press fit into inner anchor body hole 28 and collar 29 of inner anchor body 20. The press fit may be accomplished in many ways that are well known. For example, a plurality of fin shaped barbs may be constructed on lower portion 73 of flange bolt 70 which catch on a plurality of protruding grooves on the inside of inner anchor body collar 29. In this arrangement, flange bolt 70 could be replaced by a male connection tab protruding from the bottom surface 45 of main disk 41, and inner anchor body hole 28 and collar 29 could be shaped to match the shape of the connection tab. The sheathing hole 65 cut through the exterior sheathing 60 would need to be shaped to match the shape of the male connection tab and the inner anchor body hole 28. Different lengths of male connection tab could be used to accommodate different thicknesses of exterior sheathing 60.

In another example (also not shown), a twist fit connection could be used to connect the intermediate flange 40 to the inner anchor body 20, allowing the intermediate flange 40 to be inserted into the inner anchor body hole 28 and secured with a single twist.

Figure 26:
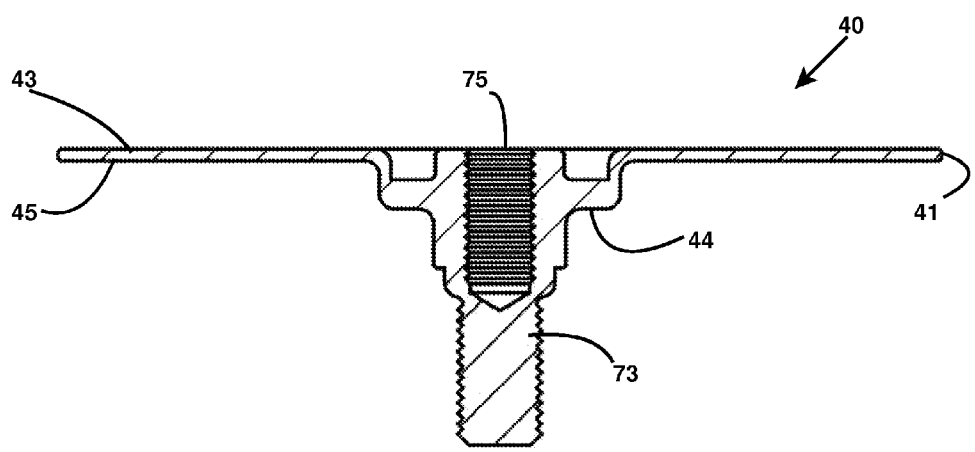
FIG. 26 shows a cross-section through the center of the intermediate flange, which is constructed as a single, unitary element.

In another option (shown in FIG. 26), intermediate flange 40, including flange bolt 70 could be made as a single, unitary airtight element, for example, if it were made from plastic or reinforced fiber, or cast from iron or steel.

Referring to FIGS. 17-24, in one embodiment, outer anchor body 30 is an "L-shaped" bracket. A long leg 32 of the outer anchor body 30 includes a slot 31 near its terminal end for accepting bent tie wire 50, shown in FIGS. 1, 2, 2*a*, 23, 24 and 25. The terminal ends of bent tie wire 50 are embedded in the mortar bed of masonry wall 100. Holes 33 may be included in long leg 32 to reduce heat flow through the cross section of the outer anchor body 30. A stiffening dimple 37 may be provided to increase rigidity and limit deformation of the outer anchor body 30 when a load is transferred to the bent tie wire 50. The length of long leg 32 may be varied to accommodate different thicknesses of insulation 90 that may be placed on the exterior of barrier membrane 80 over top of the sheathing 60.

A short leg 34 of the "L-shaped" outer anchor body 30 has a bottom surface 35 that abuts and sits flush against the barrier membrane 80 when outer anchor body 30 is connected to intermediate flange 40. Short leg 34 of outer anchor body 30 includes a hole 36 shaped and sized to capture an outer anchor body screw or bolt 38 used to threadably connect outer anchor body 30 with intermediate flange 40 via threaded cavity 75 of flange bolt 70 (see FIGS. 2 and 2*a*). A lock washer 39 may be sandwiched between the captive outer body screw 38 and the short portion 34 of outer anchor body 30 to assist in keeping captive outer body screw 38 from coming loose from flange bolt 70. Similar to the discussion above with respect to connecting the intermediate flange 40 to the inner anchor body 20, other options may be possible for connecting intermediate flange 40 to outer anchor body 30, rather than the threaded connection shown and described herein. For example, in one option (not shown) a press fit may be used, whereby the short leg 34 of outer anchor body 30 includes a protrusion that is press fit into a corresponding hole or slot in the intermediate flange 40. In another option (also not shown) a twist fit connection could be used, allowing the outer anchor body 30 to be inserted into cavity 75 of flange bolt 70 and secured to intermediate flange 40 with a single twist.

Figure 23:
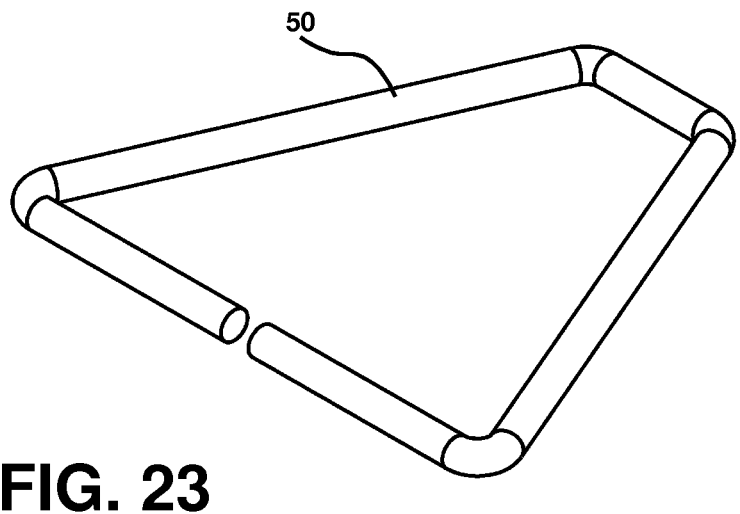
FIG. 23 is a perspective view of the bent tie wire.
Figure 24:
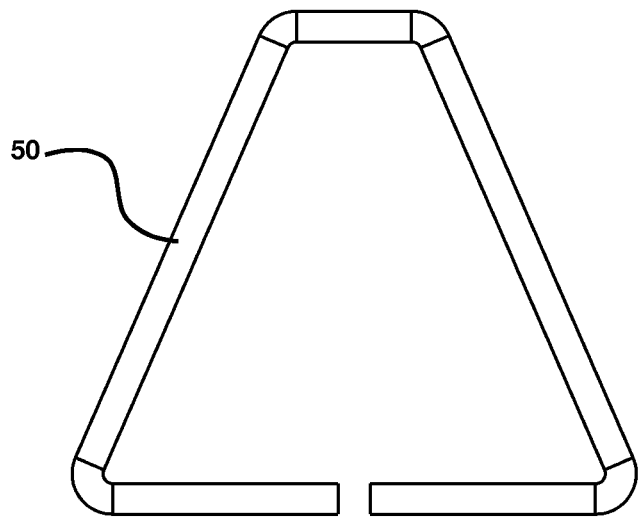
FIG. 24 is a top plan view of the bent tie wire.

To summarize, FIGS. 17-20 show a perspective view, a top plan view, a side view and a front view of outer anchor body 30, respectively. FIGS. 21 and 21*a* show a side and top plan view of outer anchor body 30, illustrating how the captive outer body screw 38 may be inserted into hole 36 and showing the placement of lock washer 39. FIG. 22 shows the captive outer body screw 38 fully inserted in hole 36, and ready for connection to intermediate flange 40. FIGS. 23 and 24 provide perspective and top plan views, respectively, of the bent tie wire 50.

Figure 25:
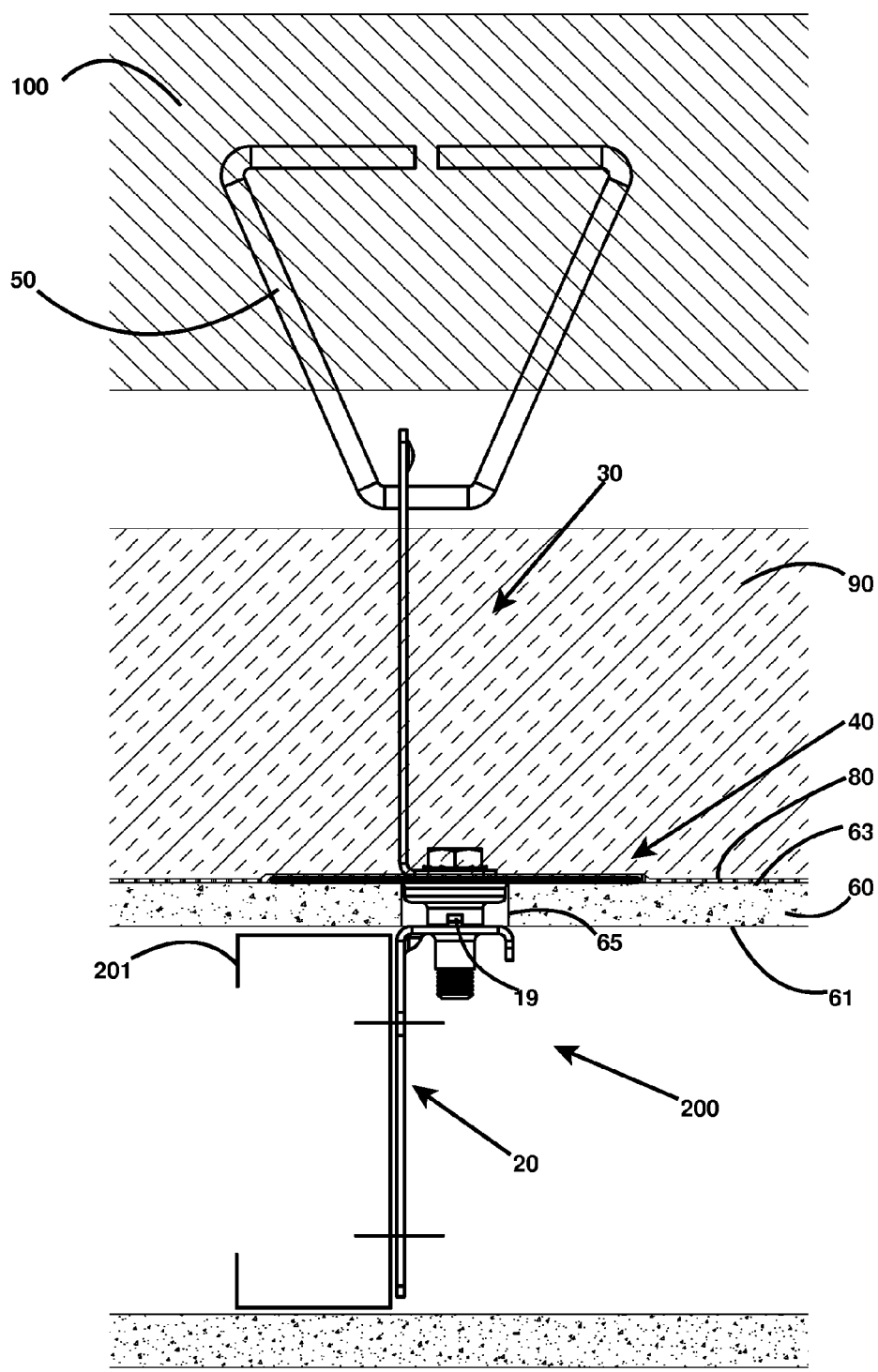
FIG. 25 is a top plan view illustrating how the present multi-piece anchor system attaches an interior stud to the exterior brick veneer wall.

In one embodiment, the multi-piece anchor 1 is installed by first gathering together the separate component parts, namely bent tie wire 50, inner anchor body 20, intermediate flange 40, and outer anchor body 30, including captive outer anchor body screw 38 and lock washer 39. Once exterior sheathing 60 has been installed, a sheathing hole 65 is drilled though exterior sheathing 60 to align with the edge of stud 201 as shown in FIG. 25. Inner anchor body hole 28 is then aligned with the center of sheathing hole 65 by seating tab 19 against the edge of the hole. Inner anchor body 20 is then affixed to the side of stud 201. Sheathing hole 65 is preferably drilled from the inside surface 61 towards the outside, using the edge of stud 201 as a guide. The lower portion 73 of flange bolt 70 of intermediate flange 40 is then inserted from the outside through sheathing hole 65 and connected to the inner anchor body 20 via internally threaded inner anchor body hole 28 and collar 29. The bottom surface 45 of intermediate flange 40 will rest flush against the outer surface 63 of the exterior sheathing 60 once the connection to the inner anchor body 20 is fully engaged. A barrier membrane 80 may then be applied over the outer surface 63 of the exterior sheathing 60 and is simply lapped over the top surface 43 of each intermediate flange 40. At this point, the barrier membrane 80 is not pierced and there is no impediment to the installation of the barrier membrane 80. Captive screw 38 is used to threadably connect outer anchor body 30 with intermediate flange 40 via internally threaded cavity 75 of custom flange bolt 70. Captive screw 38 is inserted through barrier membrane 80 and threaded into cavity 75. A lock washer 39 may be used to assist in keeping the parts from coming loose. Bent tie wire 50 is inserted into slot 31 in outer anchor body 30, the terminal ends of which are embedded in the mortar bed of masonry wall 100.

The reader will appreciate that while the barrier membrane 80 is pierced by captive screw 38 during connection of the outer anchor body 30 to the intermediate flange 40, this does not create a potential path for airflow through the exterior sheathing 60 since the barrier membrane 80 is sealed tightly against the outer surface 43 of main disk 41, there is an airtight seal between the flange bolt 70 and the flange collar 44, and the lower portion 73 of flange bolt 70 is solid.

The previous detailed description is provided to enable any person skilled in the art to make or use the present multi-piece anchor body. Various modifications to those embodiments will be readily apparent to those skilled in the art, and the generic principles defined herein may be applied to other embodiments without departing from the spirit or scope of the multi-piece anchor body described herein. Thus, the present multi-piece anchor body is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

I claim:

1. A multi-piece anchor body for connecting an inner back-up wall comprised of exterior sheathing affixed to a frame of studs an outer cladding, the multi-piece anchor body comprising:
    an inner anchor body for connection to the back-up wall;
    a separate outer anchor body having a terminal end for connection to the outer cladding; and
    a separate airtight intermediate flange for connection to and between the inner anchor body and the outer anchor body, the intermediate flange comprising a main disk and a flange bolt, the flange bolt having an external connector on a first inner end and a flange blot for connection to the inner anchor body and an internal connection cavity on a second opposite outer end of the flange bolt for connection to the outer anchor body.

2. The multi-piece anchor body of claim 1, wherein the intermediate flange is connectable to the inner anchor body through a threaded connection, a press fit, or a twist fit and the intermediate flange is connectable to the outer anchor body through a threaded connection, a press fit, or a twist fit.

3. The multi-piece anchor body of claim 1, wherein the inner anchor body, the outer anchor body and the intermediate flange are made of metal, plastic or fibre reinforced plastic.

4. The multi-piece anchor body of claim 1, wherein the inner anchor body is connectable to a side face of the studs within the back-up wall.

5. The multi-piece anchor body of claim 1, wherein the intermediate flange connects to the inner anchor body through a sheathing hole or slot cut through the exterior sheathing.

6. The multi-piece anchor body of claim 5, wherein the inner anchor body includes an alignment tab for aligning the inner anchor body with the sheathing hole or slot to facilitate connection of the intermediate flange to the inner anchor body and to ensure that the intermediate flange may be positioned flush against an outer surface of the exterior sheathing.

7. The multi-piece anchor body of claim 1, wherein the intermediate flange is a single, unitary airtight element.

8. The multi-piece anchor body of claim 1, wherein the main disk is greater than 50 mm in diameter.

9. The multi-piece anchor body of claim 1, wherein the outer cladding is a masonry wall and the terminal end of the outer anchor body accepts connection of a bent tie wire that my be embedded in the masonry wall.

10. The multi-piece anchor body of claim 9, wherein the terminal end of the outer anchor body is reinforced to limit deformation of the outer anchor body when a load is transferred to the bent tie wire.

11. The multi-piece anchor body of claim 1, wherein the first inner end of the flange bolt is solid to thereby prevent air leakage through the intermediate flange.

* * * * *